(12) United States Patent
Nygren et al.

(10) Patent No.: US 6,439,122 B1
(45) Date of Patent: Aug. 27, 2002

(54) SEPARATION SYSTEM FOR MISSILE PAYLOAD FAIRINGS

(75) Inventors: William D. Nygren, Denver; Perry Ramsey, Littleton, both of CO (US)

(73) Assignee: Lockhead Martin Corporation, Bethesda, MD (US)

( * ) Notice: Subject to any disclaimer, the term of this patent is extended or adjusted under 35 U.S.C. 154(b) by 0 days.

(21) Appl. No.: 09/493,310

(22) Filed: Jan. 28, 2000

(51) Int. Cl.[7] ................................................ F42B 15/10
(52) U.S. Cl. .................... 102/377; 244/158 R; 244/169; 102/348
(58) Field of Search .................... 102/377, 348, 102/357, 393; 244/158 R, 169, 172; 89/1.14

(56) References Cited

U.S. PATENT DOCUMENTS

| | | | | |
|---|---|---|---|---|
| 4,495,849 A | * | 1/1985 | Cooke et al. | 89/1.14 |
| 5,046,426 A | | 9/1991 | Julien et al. | 102/337 |
| 5,516,080 A | * | 5/1996 | McVaugh | 254/134.3 FT |
| 5,743,492 A | | 4/1998 | Chan et al. | 244/118.2 |

FOREIGN PATENT DOCUMENTS

RU          1152839 A  *  4/1985

* cited by examiner

Primary Examiner—Peter M. Poon
Assistant Examiner—Floris C Copier
(74) Attorney, Agent, or Firm—Marsh Fischmann & Breyfogle LLP

(57) ABSTRACT

In detail, the system includes at least one first pulley mounted on the first structural member and at least one-second pulley mounted on the second structural member. A cable is attached by one end to the first structural member and wound about the first and second pulleys and is attached by its second end to the second structural member. Preferably there are two or more first and second pulleys with the cable alternately wound between said first and second pulleys with one end of cable attached to the first structural member and the opposite end attached to the second structural member. Thus the cable holds the first and second structural members together. A system to sever the cable is included, which upon actuation will sever the cable allowing the two structural members to separate.

21 Claims, 5 Drawing Sheets

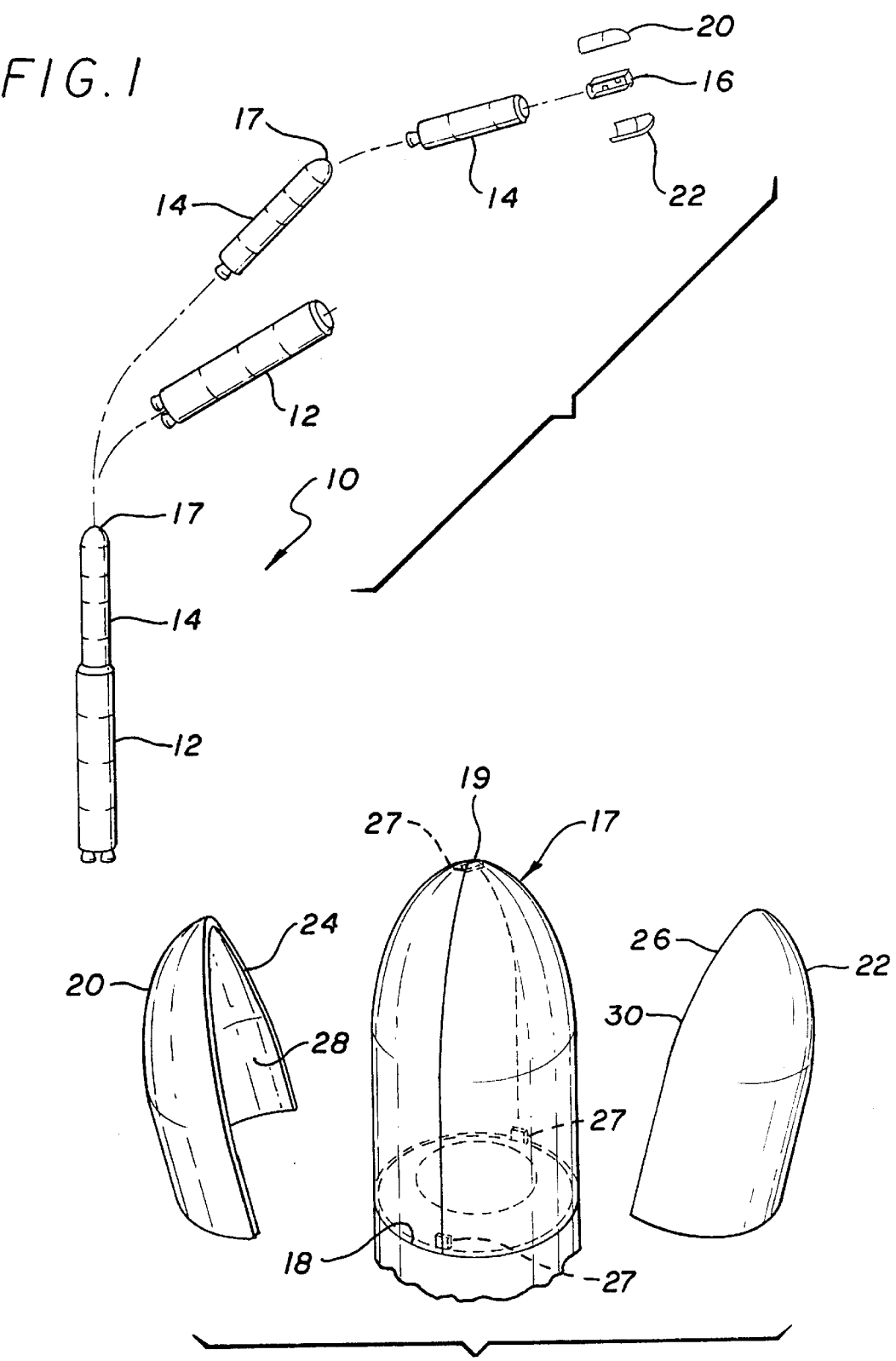

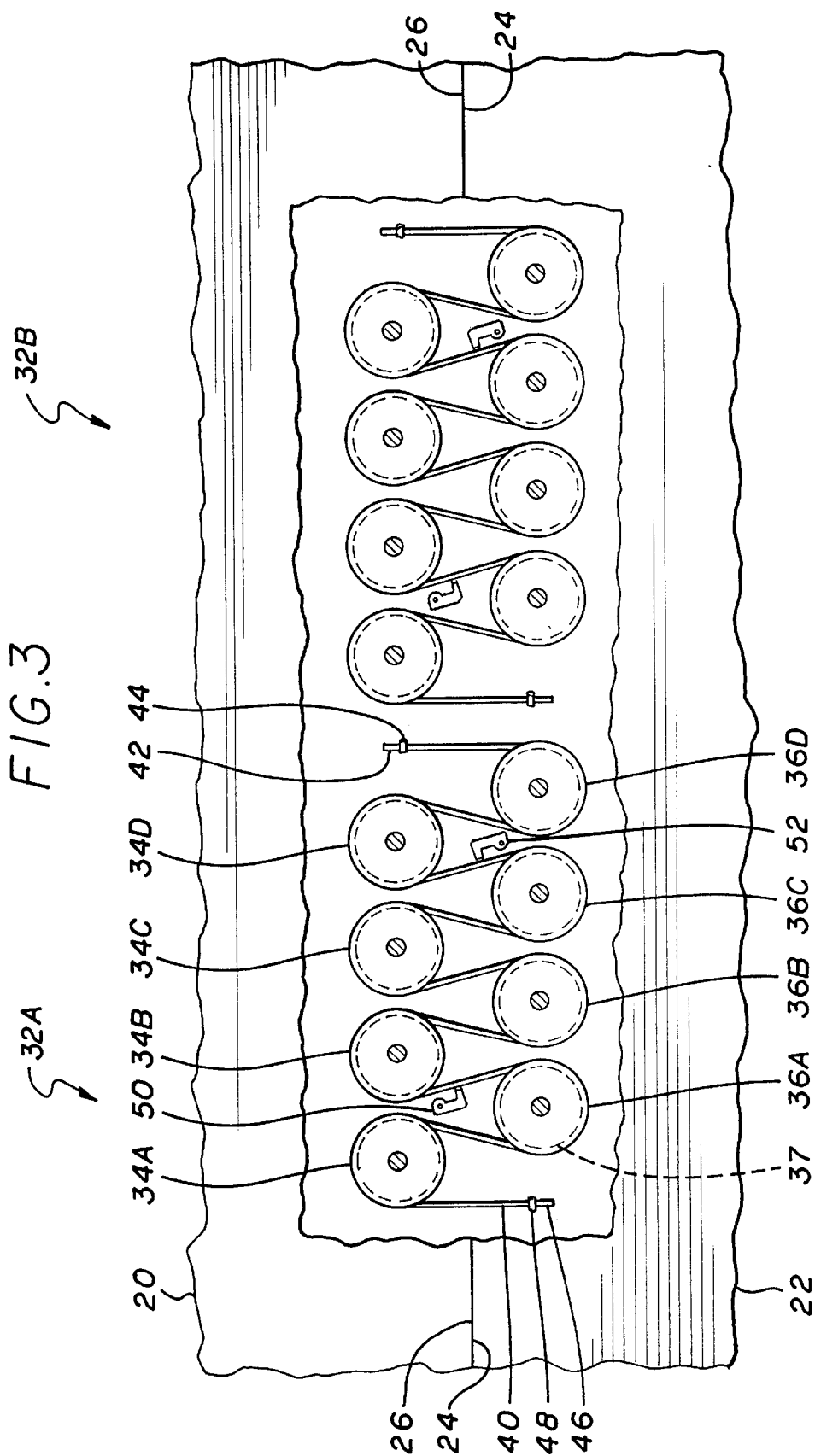

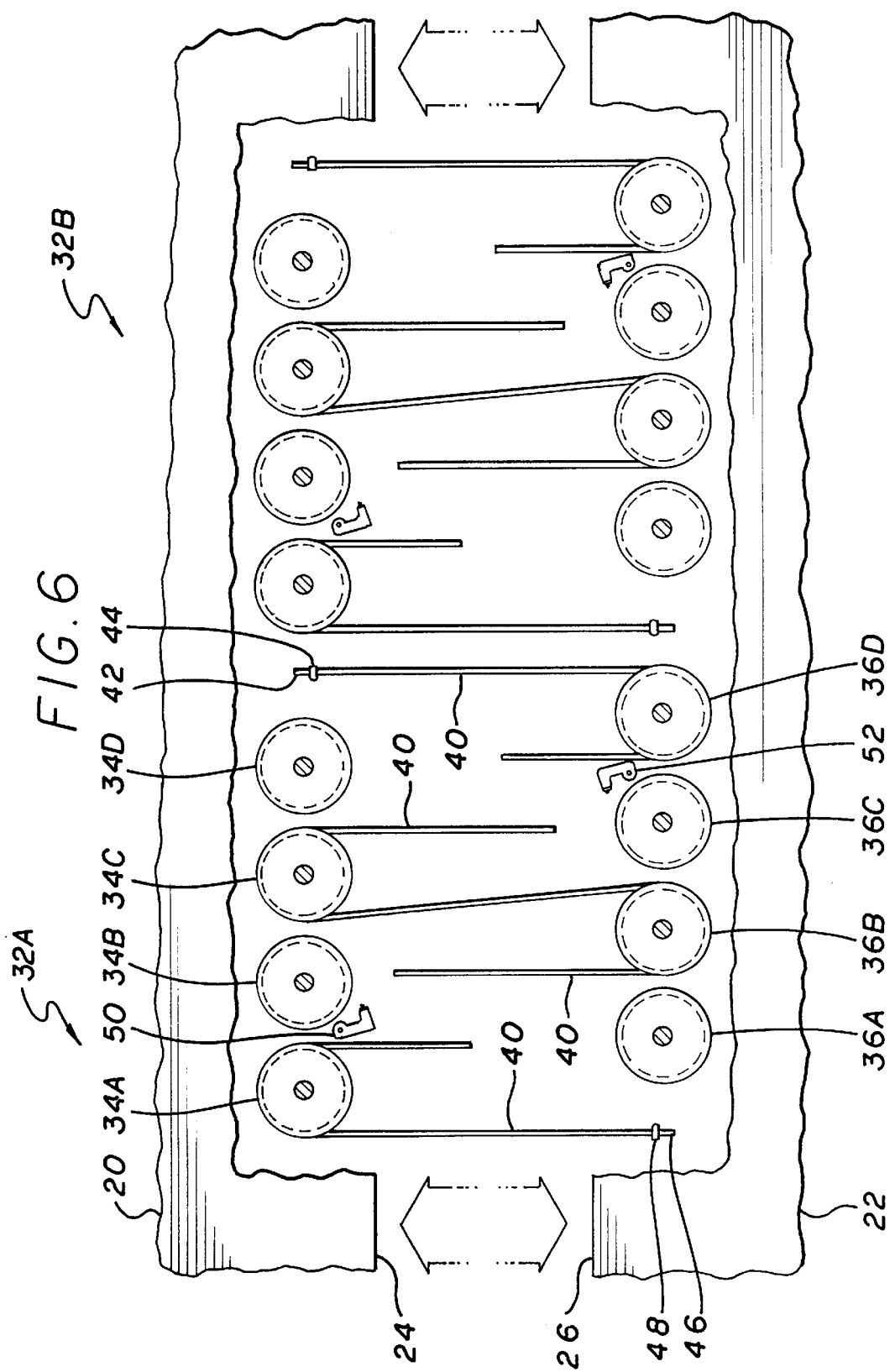

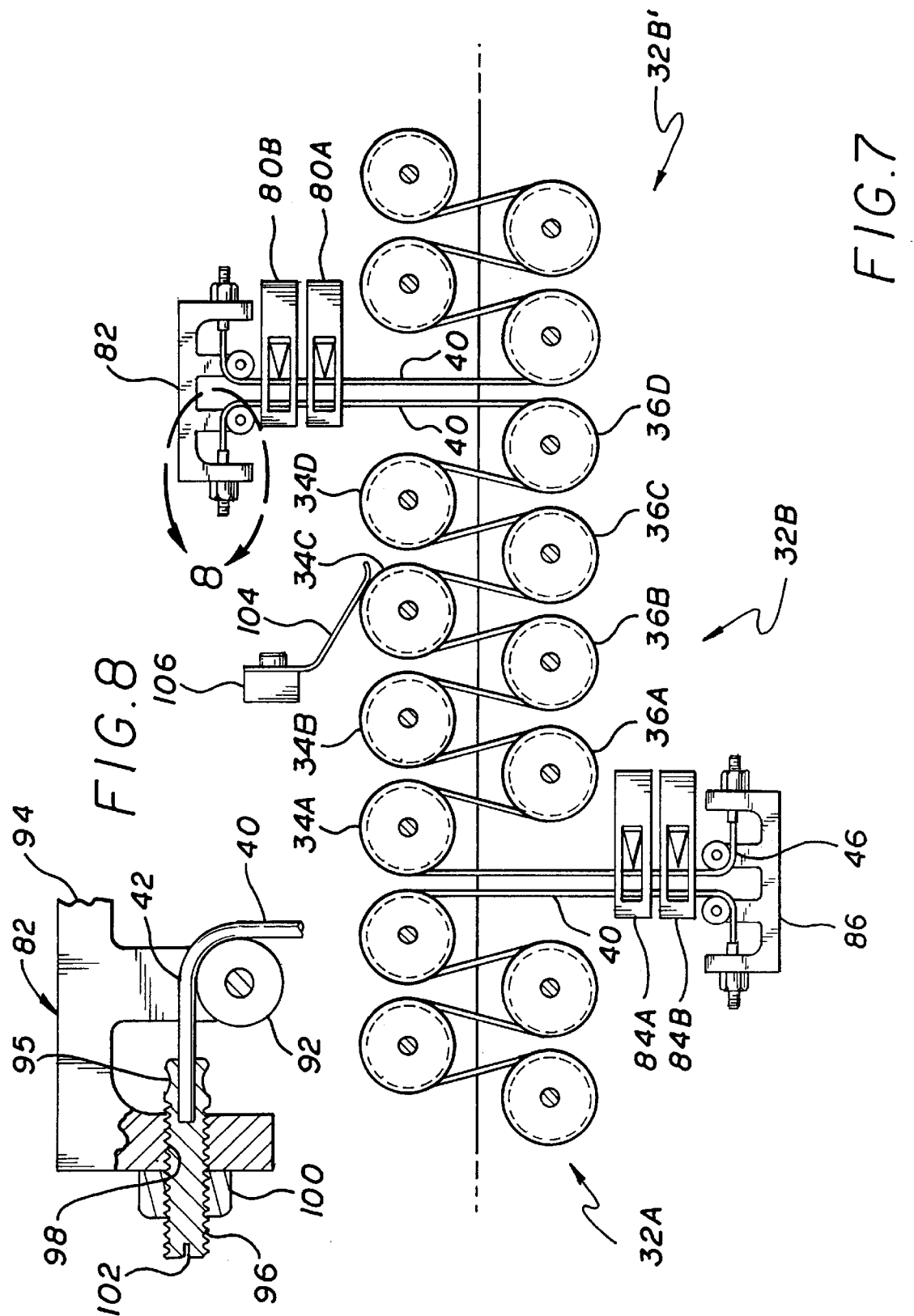

SEPARATION SYSTEM FOR MISSILE PAYLOAD FAIRINGS

BACKGROUND OF THE INVENTION

1. Field of the Invention

The invention relates to the field of separation systems for missile launch vehicle payload fairings and the like and, in particular, to a separation system that reduces shock loads in the missile and payload.

2. Description of Related Art

The typical systems for mechanically securing segments of a payload fairing together use explosively actuated fasteners, such as explosive bolts and the like. Another type of explosive actuated system uses a metal coupling to join the segments of the fairing together. A tubular member is positioned next to or within the coupling. Upon ignition, the explosive expands the tubular member, which in turn fractures the coupling. Such a system is disclosed in U.S. Pat. No. 5,443,492 "Payload Housing And Assembly Joint For A Launch Vehicle" by A. L. Chan, et al.

However, pyrotechnic fasteners and the like, while well proven, can not be tested prior to use, thus must be assembled with great care. This makes them generally expensive to manufacture. Special storage areas must be set aside for any device containing explosives. They are always subject to inadvertent actuation, and, therefore, handled with great care. Additionally, they are particularly subject to ignition by electromagnetic interference (EMI) and thus must be protected by EMI shielding devices, which also raises the cost. Another disadvantage is that, due to the fact that the explosive charge can be ignited by exposure to high temperature, they have a limited environmental temperature range. One of the most important disadvantages is that upon actuation, most generate significant shock loads, which can damage nearby equipment.

Thus in order to eliminate the above disadvantages non-pyrotechnic designs have emerged. For example, U.S. Pat. No. 5,046,426 "Sequential Structural Separation System" by G. J. Julien, et al. uses a sequence of wires or foil strips attached by their ends to the edges of adjoining segments, thus securing them together. But when heated the wires or foils melt allowing the segments to separate. By varying the lengths of the wires or foils in sequence, they can be made to fuse in sequence. The disadvantage of this system is that every wire or foil must be separately connected to an electrical circuit. This adds complexity.

Thus, it is a primary object of the invention to provide a system for securing the segments of a structure together and to provide for separation of the segments.

It is another primary object of the invention to provide a system for securing the segments of a structure together and to provide for the separation of the segments in a sequential manner.

It is a further object of the invention to provide a system for securing the segments of a structure together and to provide for separation of the segments without significant shock loads being introduced into the structure.

SUMMARY OF THE INVENTION

The invention is a separation system for releasably securing first and second structural members together. In detail, the invention includes at least one first pulley mounted on the first structural member and at least one-second pulley mounted on the second structural member. A cable is attached by one end to the first structural member and wound about the first and second pulleys and is attached by its second end to the second structural member. Preferably there are two or more first and second pulleys with the cable alternately wound between said first and second pulleys with one end of cable attached to the first structural member and the opposite end attached to the second structural member. Thus the cable holds the first and second structural members together. A system to sever the cable is included, which upon actuation will allow the two structural members to separate. Preferably the system to sever the cable is an explosively actuated cable cutter. In addition, a retaining device is provided for securing the cable to one of the pulleys such that upon severing thereof, the cable is secured to the fairing half.

The cable is preferably made of a low melting point high strength material such as a liquid crystal thermotropic (melt spun) polyester polyarylate fiber such as VECTRAN® manufactured by Hoechst Celanese, Charlotte, N.C., or a lyotropic (solvent spun) aromatic polyaramide fiber, such as KEVLAR®, manufactured by E. I. duPont de Nemours & Company, Delaware.

The system to sever the cable can also include at least one heating device in contact with the cable and coupled to an electrical power supply. The at least one heating device includes an arm having first and second ends, with the first end pivotally attached to one of the structural members in proximity to the cable. A heating element is mounted on the second end of the arm. A spring is used to urge the arm toward the cable such that the heating element is in contact with the cable. Thus upon actuation, the heating element "melts" through the cable allowing the fairing halves to separate.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

FIG. 1 is a perspective view of the launch sequence of a booster rocket for placing a satellite in orbit.

FIG. 2 is an enlarged view of a portion of FIG. 1 illustrating separation of the fairing from the satellite.

FIG. 3 is a partial side view of the faring shown in FIGS. 1 and 2 in the assembled position partially broken away to show the separation system for the fairing.

FIG. 6 is a view similar to FIG. 3 illustrating the separation system in the released condition.

FIG. 7 is a view similar to FIG. 3 illustrating a second embodiment of the invention.

FIG. 8 is an enlarged view of a portion of FIG. 7 illustrating the details of a system for controlling the tension on the cable.

DESCRIPTION OF THE PREFERRED EMBODIMENT

Figure 4:
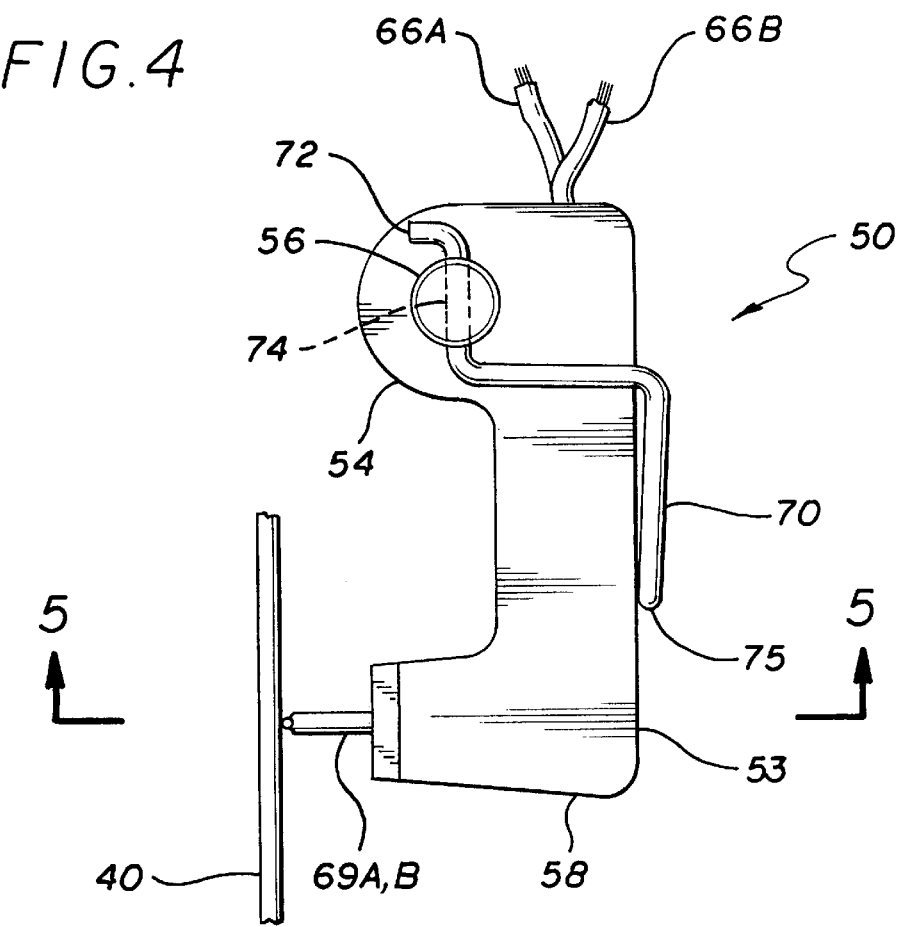
FIG. 4 is an enlarged view of a portion of FIG. 3 illustrating the system for severing the cables holding the parts of the fairing together.

Referring to FIGS. 1 and 2, the typical launch vehicle, generally indicated by numeral 10, includes a first stage 12 and second stage 14 upon which is mounted a satellite 16 covered by a fairing assembly 17. The faring assembly 17 is generally cone shaped having a bottom base portion 18 and a nose end 19. Typically two or more stages are necessary to place a satellite in orbit. Sometimes the satellite itself incorporates its own rocket engine to place it in a specific orbit. During takeoff and through final burnout of the second stage 14 extremely high loads are introduced into the fairing assembly 17, which are produced by aerodynamic forces as the launch booster accelerates through the atmosphere, as well as those induced by vibration loads produced by the propulsion system.

Figure 5:
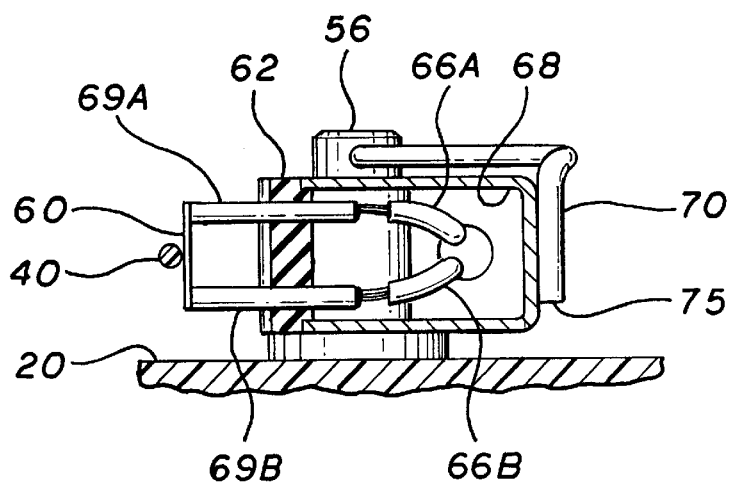
FIG. 5 is a cross-sectional view of FIG. 4 taken along the line 5—5.

Referring to FIGS. 2–6, the fairing as illustrated comprises two fairing halves 20 and 22 having mating edges 24 and 26. Mounted at the base portion 18 and at the nose 19 are explosive fastener assemblies 27. These explosive fastener assemblies 27 are well known in the art and need not be discussed further. Of course, other types of fasteners could be used. Mounted on the interior surfaces 28 and 30 of the fairing halves 20 and 22 are a plurality of release mechanisms 32, with the number varying depending upon the size of the fairing assembly. Each release mechanism 32A and B includes a plurality of pulleys 34A through 34D mounted on fairing halve 20 and a similar number of pulleys 36A through 36D mounted on fairing halve 22 having a groove 37 about their peripheries. Of course, the number may vary from as low as one on each fairing. The pulleys 34A–D and 36A–D are preferably rotatably mounted using anti-friction bearings (not shown); however, in this application, they can be fixed in place.

A cable 40 is attached by one end 42 to fairing halve 20 by an attachment fitting 44 and is alternately wound around pulleys 34 and 36, within the grooves 37, and attached at its opposite end 46 to attachment fitting 48 mounted to faring halve 22. The cable 40 preferably is made from a lyotropic (solvent spun) aromatic polyaramide fiber, such as KEVLAR®, or a liquid crystal thermotropic (melt spun) polyester polyarylate fiber such as VECTRAN® with a diameter around 0.125 inch. Such a cable will provide around 2000 pound tension breaking strength. Other high strength low melting point materials can be used to manufacture the cable 40. It is desirable to have the cable crisscross the fairing joint around 4 times per inch providing 2000 pounds of force per inch (plus margins) holding the two fairing halves 20 and 22 together. The diameter of the pulleys 34 and 36 are thus less than 1.0 inch.

Each release mechanism 32 includes redundant cable cutters 50 and 52 attached to the fairing halves 20 and 22, respectively, for severing the cable 40. The cutter 50 includes an arm 53 pivotally attached to the fairing halve 20 at its end 54 by means of pin 56. The opposite end 58 includes a heating element 60 made of a material such as Nichrome wire, which when subjected to an electrical current will heat up to a sufficient temperature within a fraction of a second to melt the cable 40. Upon melting, the cable 40 will fail releasing the tension load. The heating element 60 is insulated from the end 58 of the arm 53 by a spacer 62 made of an insulating material. Electrical wires 66A and 66B mounted within an internal passageway 68 supply electrical current via pins 69A and 69B from a power source (not shown). A wire spring 70 secured by a first end 72 mounted in a hole 74 in the pin 56 and a second end 75 that engages the arm 53 forces the heating element 60 into contact with the cable 40. Of course, other types of devices can be used to server the cable 40.

Referring to FIGS. 7 and 8, in a second embodiment of the invention, the cable 40 of release mechanism 32B at end 42 passes through two explosively actuated cable cutters 80A and 80B and is connected to a cable tension control device 82 mounted on the fairing 20. End 46 of the cable 40 also passes through redundant cable cutters 84A and 84B and connects to tension control device 86 mounted on fairing 22. As illustrated the cable 40 from the adjacent release mechanism 32B' also passes through cutters 80A and 80B and cable 40 from 32A also passes through the cable cutters 84A and 84B. This provides increased reliability.

The cable end 42 engages a roller 92 mounted on support structure 94 of the tension control device 82 and terminates in a swaged connection 95 with a threaded rod 96. Control device 82 is in turn mounted on fairing half 20. The rod 96 extends through a hole 98 in support structure 94. A nut 100 threadably mounted on the rod 96 is used to adjust the position of the rod and thus the tension on the cable 40. The rod 96 includes a slot 102 for receiving a screwdriver for preventing rotation of the rod during the adjustment of cable 40 tension. Tension control device 86 operates in a similar fashion but is mounted on fairing half 22. A spring-biased arm 104 is mounted to block 106 and is in contact with the pulley 34C. When the cable 40 is cut, it holds the cable 40 in place as the fairing halves 20 and 22 separated preventing the cable 40 from flying free and possibly hitting the payload. In addition, should one of the cable cutter pairs 80A–B fail to operate, the cable 40 can still slide under the arm 104 and allow separation while remaining attached to one fairing half. This spring biased arm 104 can also be used with the embodiment shown in FIG. 3.

Referring back to FIGS. 1 and 2, when the second stage 14 of the launch vehicle 10 reaches orbit and the second stage propulsion system has terminated operation, the fairing assembly 17 is no longer subjected to aerodynamic loads. At this point the release mechanisms 32 can be actuated to the unlatched positions. Thereafter, low shock producing explosive bolts 27 can be actuated allowing the fairing halves 20 and 22 to separate. Thus it can be seen that the subject invention provides a secure and complete joining of the fairing halves 20 and 22, with a very low shock unlatching.

The advantage of this design over the one disclosed in the previously mentioned U.S. Pat. No. 5,046,426 "Sequential Structural Separation System" by G. J. Julien, et al. is that less electrical power is required to sever the joint. In the G. J. Julien, et al. device, each foil element must be individually heated to failure. Here, depending on the number of pulley pairs used in each release mechanism 32, there is always only one required or two if redundancy is required.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the spacecraft launch vehicle industry.

What is claimed is:

1. A separation system comprising:

first and second structural members releasably secured together along mating edges thereof;

a separation assembly for releasably securing said first and second structural members together along the mating edges and comprising:

at least one first pulley mounted on said first structural member;

at least one second pulley mounted on said second structural member;

a cable alternately wound between said first and second pulleys and having a first end terminating at said first structural member and a second end terminating at said second structural member to secure said first structural member and said second structural member together along the mating edges thereof, and means to sever said cable to sequentially separate said first structural member from said second structural member along the mating edges.

2. The separation system as set forth in claim 1 comprising means to adjust the tension level of said cable.

3. The separation system as set forth in claim 2 comprising:

a plurality of said first pulleys and a plurality of said second pulleys, wherein said cable is alternately wound between said plurality of first pulleys and said plurality of second pulleys.

4. The separation system as set forth in claim 2 comprising:

said cable having a low melting point; and said means to sever said cable includes means to melt said cable.

5. The separation system as set forth in claim 4 comprising:

said cable is made of a material selected from the group consisting of a liquid crystal thermotropic (melt spun) polyester polyarylate fiber, or a lyotropic (solvent spun) aromatic polyaramide fiber.

6. The separation system as set forth in claim 5 wherein said means to melt said cable comprises:

at least one electrical heating means in contact with said cable; and means to supply electrical power to said at least one heating means.

7. The separation system as set forth in claim 6 wherein said at least one electrical heating means in contact with said cable comprises:

a arm having first and second ends, said first end pivotally attached to one of the structural members in proximity to said cable;

a heating element mounted on said second end of said arm; and biasing means for urging said arm toward said cable such that said heating element is in contact with said cable.

8. The separation system as set forth in claim 2 wherein said means to sever said cable is an explosively actuated cable cutter.

9. The separation system as set forth in one of claims 1–6, in which said first end of said cable is attached to the first structural member and said second end of said cable is attached to the second structural member.

10. The separation system as set forth in claim 8 further comprising:

means mounted on one of said first and second structural members for holding said cable to one of said at least one first pulley and at least one second pulley, after said cable has been severed.

11. The separation system as set forth in claim 1 wherein substantially zero shock is produced in the separation system when the cable is severed to sequentially separate said first structural member from said second structural member along the mating edges.

12. The separation system as set forth in claim 1 wherein said first and second structural members are first and second fairing sections.

13. A separation system for releasably securing first and second structural members together, comprising:

two or more first pulleys mounted on said first structural member;

two or more second pulleys mounted on said second structural member;

a cable having first and second ends alternately wound between said first and second pulleys and with said first end terminating at said first structural member and said second end terminating at said second structural member;

means to adjust the tension level of said cable; and means to sever said cable.

14. The separation system as set forth in claim 13 comprising:

said cable having a low melting point; and said means to sever said cable includes means to melt said cable.

15. The separation system as set forth in claim 14 comprising:

said cable is made of a material selected from the group consisting of a liquid crystal thermotropic (melt spun) polyester polyarylate fiber, or a lyotropic (solvent spun) aromatic polyaramide fiber.

16. The separation system as set forth in claim 14 wherein said means to melt said cable comprises:

at least one electrical heating means in contact with said cable; and means to supply electrical power to said at least one heating means.

17. The separation system as set forth in claim 16 further comprising:

means mounted on one of said first and second structural members for holding said cable to one of said at least one first pulley and at least one second pulley, after said cable has been severed.

18. A separation system for releasably securing first and second structural members together, comprising:

two or more first pulleys mounted on said first structural member;

two or more second pulleys mounted on said second structural member;

a cable having first and second ends alternately wound between said first and second pulleys and with said first end terminating at said first structural member and said second end terminating at said second structural member, wherein said cable has a low melting point;

means to adjust the tension level of said cable; and means to melt said cable.

19. The separation system as set forth in claim 18 comprising:

said cable is made of a material selected from the group consisting of a liquid crystal thermotropic (melt spun) polyester polyarylate fiber, or a lyotropic (solvent spun) aromatic polyaramide fiber.

20. The separation system as set forth in claim 18 wherein said means to melt said cable comprises:

at least one electrical heating means in contact with said cable; and means to supply electrical power to said at least one heating means.

21. The separation system as set forth in claim 18 further comprising:

means mounted on one of said first and second structural members for holding said cable to one of said at least one first pulley and at least one second pulley, after said cable has been severed.

* * * * *

UNITED STATES PATENT AND TRADEMARK OFFICE
CERTIFICATE OF CORRECTION

PATENT NO. : 6,439,122 B1
DATED : August 27, 2002
INVENTOR(S) : Nygren et al.

It is certified that error appears in the above-identified patent and that said Letters Patent is hereby corrected as shown below:

<u>Title page,</u>
Item [73], delete "Lockhead", and insert therefor -- Lockheed --.

Signed and Sealed this

Thirty-first Day of December, 2002

JAMES E. ROGAN
*Director of the United States Patent and Trademark Office*